United States Patent
Cox et al.

(10) Patent No.: US 8,499,739 B2
(45) Date of Patent: Aug. 6, 2013

(54) INJECTOR HAVING TANGENTIALLY ORIENTED PURGE LINE

(75) Inventors: Glenn Brian Cox, Peoria, IL (US); Stephen Michael Wiley, East Peoria, IL (US); Alan R. Stockner, Metamora, IL (US); Thomas Randall McClure, Washington, IL (US); Xiaohui Gong, Dunlap, IL (US); Qiang Chen, Peoria, IL (US); Robert Lowell Miller, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 357 days.

(21) Appl. No.: 11/513,284

(22) Filed: Aug. 31, 2006

(65) Prior Publication Data
US 2008/0053069 A1 Mar. 6, 2008

(51) Int. Cl.
F02M 43/00 (2006.01)
(52) U.S. Cl.
USPC ............... 123/304; 123/305; 60/286; 60/274; 60/285; 60/301; 239/125; 239/128
(58) Field of Classification Search
USPC .............. 60/39.094, 286, 274, 295, 298, 285, 60/301, 303; 123/299, 305, 294, 296, 298, 123/301, 467, 468, 469, 470, 471; 702/34; 73/118.1; 239/404, 405, 406, 125, 128, 130, 239/135
See application file for complete search history.

(56) References Cited

U.S. PATENT DOCUMENTS

| | | | |
|---|---|---|---|
| 2,635,425 A | | 4/1953 | Thorpe et al. |
| 3,383,854 A | | 5/1968 | White |
| 3,690,093 A | | 9/1972 | Carlisle |
| 3,742,682 A | | 7/1973 | Ligutom |
| 3,957,467 A | | 5/1976 | Kim |
| 4,128,997 A | | 12/1978 | Suzuki et al. |
| 4,300,924 A | | 11/1981 | Coyle |
| 4,358,266 A | * | 11/1982 | Pont et al. ............... 431/90 |
| 4,502,278 A | | 3/1985 | Stark |
| 4,533,316 A | | 8/1985 | Takino et al. |
| 4,615,173 A | * | 10/1986 | Usui et al. ............... 60/286 |
| 4,622,811 A | | 11/1986 | Distel et al. |
| H172 H | | 12/1986 | Pribyl et al. |
| 4,719,751 A | | 1/1988 | Kume et al. |

(Continued)

FOREIGN PATENT DOCUMENTS

| | | |
|---|---|---|
| EP | 1 336 729 | 8/2003 |
| EP | 1 655 463 A1 | 5/2006 |

(Continued)

OTHER PUBLICATIONS

Harmon et al., U.S. Appl. No. 11/170,318, filed Jun. 30, 2005, entitled "Regeneration Assembly."

(Continued)

Primary Examiner — Noah Kamen
Assistant Examiner — Long T Tran
(74) Attorney, Agent, or Firm — Finnegan, Henderson, Farabow, Garrett & Dunner LLP

(57) ABSTRACT

A fluid injector for an exhaust treatment device is disclosed. The fluid injector may have a housing at least partially forming a fluid chamber. The housing may have a central axis, and a fluid passageway configured to supply fluid to the fluid chamber. The supply of fluid may be in a tangential direction relative to the central axis.

24 Claims, 2 Drawing Sheets

U.S. PATENT DOCUMENTS

| | | | |
|---|---|---|---|
| 4,787,349 A | 11/1988 | Hilger | |
| 4,834,043 A | 5/1989 | Kaczynski et al. | |
| 4,987,738 A | 1/1991 | Lopez-Crevillen et al. | |
| 5,001,899 A | 3/1991 | Santiago et al. | |
| 5,095,694 A | 3/1992 | Shekleton et al. | |
| 5,177,958 A | 1/1993 | Clemens et al. | |
| 5,243,816 A | 9/1993 | Huddas | |
| 5,273,020 A | 12/1993 | Hayami | |
| 5,417,054 A * | 5/1995 | Lee et al. | 60/39.094 |
| 5,417,059 A | 5/1995 | Haertel et al. | |
| 5,701,732 A | 12/1997 | Nesbitt et al. | |
| 5,771,689 A | 6/1998 | Bareis et al. | |
| 5,881,550 A | 3/1999 | Toelle | |
| 6,032,462 A | 3/2000 | Chu | |
| 6,050,081 A | 4/2000 | Jansen et al. | |
| 6,125,624 A | 10/2000 | Prociw | |
| 6,250,065 B1 | 6/2001 | Mandai et al. | |
| 6,289,869 B1 | 9/2001 | Elliott | |
| 6,438,963 B1 | 8/2002 | Traver et al. | |
| 6,439,191 B1 | 8/2002 | Elliott | |
| 6,470,673 B1 | 10/2002 | van Nieuwstadt et al. | |
| 6,536,217 B2 | 3/2003 | Lipinski et al. | |
| 6,688,533 B2 | 2/2004 | Nines et al. | |
| 6,931,831 B2 | 8/2005 | Jansen | |
| 6,938,607 B1 | 9/2005 | Nogi et al. | |
| 7,017,335 B2 | 3/2006 | Huber et al. | |
| 7,063,642 B1 * | 6/2006 | Hu et al. | 477/100 |
| 7,104,250 B1 * | 9/2006 | Yi et al. | 123/305 |
| 7,277,801 B2 * | 10/2007 | Webb et al. | 702/34 |
| 2004/0020193 A1 | 2/2004 | Miebach | |
| 2004/0173190 A1 | 9/2004 | Makino | |
| 2005/0150221 A1 | 7/2005 | Crawley et al. | |
| 2005/0252201 A1 | 11/2005 | Lecea et al. | |
| 2005/0284136 A1 | 12/2005 | Plougmann | |
| 2006/0016198 A1 | 1/2006 | Stuttaford et al. | |
| 2006/0101810 A1 | 5/2006 | Angelo et al. | |
| 2006/0156733 A1 | 7/2006 | Prociw et al. | |
| 2006/0201239 A1 * | 9/2006 | Webb et al. | 73/118.1 |
| 2007/0000241 A1 | 1/2007 | Funke et al. | |
| 2007/0264602 A1 * | 11/2007 | Frenette et al. | 431/253 |
| 2007/0283693 A1 * | 12/2007 | Mulloy et al. | 60/598 |
| 2008/0016851 A1 | 1/2008 | McCarthy et al. | |
| 2008/0022663 A1 | 1/2008 | Dodge et al. | |
| 2008/0034734 A1 | 2/2008 | Karkkainen et al. | |
| 2008/0078172 A1 | 4/2008 | Miller et al. | |

FOREIGN PATENT DOCUMENTS

| | | |
|---|---|---|
| EP | 1 683 967 A1 | 7/2006 |
| GB | 1212443 | 11/1970 |
| JP | 61-119918 | 6/1986 |
| JP | 7-18549 | 3/1995 |

OTHER PUBLICATIONS

Miller et al., U.S. Appl. No. 11/503,305, filed Aug. 14, 2006, entitled "Fuel Supply Component Purging System."

Karkkainen et al., U.S. Appl. No. 11/503,306, filed Aug. 14, 2006, entitled "Fuel Supply Component Cleaning System."

PCT Partial International Search Report; Applicant's Ref. No. 06-677; PCT/US2007/017094; Filing Date: Jul. 31, 2007; Applicant: Caterpillar Inc.

* cited by examiner

INJECTOR HAVING TANGENTIALLY ORIENTED PURGE LINE

TECHNICAL FIELD

The present disclosure is directed to a fluid injector and, more particularly, to a fluid injector having a purge line oriented tangentially relative to a central axis.

BACKGROUND

Engines, including diesel engines, gasoline engines, gaseous fuel powered engines, and other engines known in the art exhaust a complex mixture of air pollutants. These air pollutants include solid material known as particulate matter or soot. Due to increased attention on the environment, exhaust emission standards have become more stringent and the amount of particulate matter emitted from an engine is regulated depending on the type of engine, size of engine, and/or class of engine.

One method implemented by engine manufacturers to comply with the regulation of particulate matter exhausted to the environment has been to remove the particulate matter from the exhaust flow of an engine with a device called a particulate trap. A particulate trap is a filter designed to trap particulate matter and typically consists of a wire mesh or ceramic honeycomb medium. However, the use of the particulate trap for extended periods of time may cause the particulate matter to build up in the medium, thereby reducing the functionality of the filter and subsequently engine performance.

The collected particulate matter may be removed from the filter through a process called regeneration. To initiate regeneration of the filter, the temperature of the particulate matter entrained within the filter must be elevated to a combustion threshold, at which the particulate matter is burned away. One way to elevate the temperature of the particulate matter is to inject fuel into the exhaust flow of the engine and ignite the injected fuel. During the regeneration event, fuel may flow through a supply circuit to the fuel injector to support combustion of the particulate matter.

After the regeneration event, the supply of fuel is shut off. However, some fuel may remain with the fuel supply circuit and the fuel injector. This remaining fuel, when subjected to the harsh conditions of the exhaust stream may coke or be partially burned, leaving behind a solid residue that can restrict or even block the fuel injector and passages of the supply circuit. In addition, it may be possible for particulate matter from the exhaust flow to enter and block the injector and passages of the supply circuit. For this reason, it may be necessary to periodically purge the injector and/or supply circuit of fuel between regeneration events.

One method of purging a fuel injector is described in U.S. Pat. No. 4,987,738 (the '738 patent) issued to Lopez-Crevillen et al. on Jan. 29, 1991. Specifically, the '738 patent discloses a particulate filter having a burner used to incinerate trapped particulates. The burner includes a fuel injector nozzle for injecting fuel into the burner during regeneration. As illustrated in FIG. 1 of the '738 patent, a fuel pump supplies fuel to the injector nozzle via a passageway axially aligned with a bore of the nozzle. In order to maintain efficient and reliable operation of the burner, a supply of purge air is directed through the axially aligned passageway to the fuel injector nozzle following a regeneration event to purge the nozzle of fuel. Purge air continues to flow through the injector nozzle until a subsequent regeneration event.

Although the burner of the '738 patent may benefit somewhat from the purging process described above, the gain may be limited. In particular, because the purge air is directed into the fuel injector nozzle in an axial manner, some fuel may still remain in the nozzle at locations radially removed from the center of the nozzle bore. Any remaining fuel can result in restriction or clogging of the fuel nozzle.

The fluid injector of the present disclosure solves one or more of the problems set forth above.

SUMMARY OF THE INVENTION

One aspect of the present disclosure is directed to fluid injector. The fluid injector may include a housing at least partially forming a fluid chamber. The housing may include a central axis, and a fluid passageway configured to supply fluid to the fluid chamber. The supply of fluid may be in a tangential direction relative to the central axis.

Another aspect of the present disclosure is directed to another fluid injector. The fluid injector may include a housing having a bore, and a passageway configured to supply fluid to the bore. The fluid injector may also include a nozzle member disposed within the bore to form a chamber receiving fluid from the passageway. The nozzle member may have an upper surface with a female taper in communication with the chamber and directed toward a tip of the nozzle member.

Yet another aspect of the present disclosure is directed to a method of purging an injector. The method may include pressurizing a flow of fuel, and directing the flow of fuel through an injector. The method may also include pressurizing a flow of air, generating a swirl in the flow of air, and directing the swirling flow of air through the injector.

DETAILED DESCRIPTION

Figure 1:
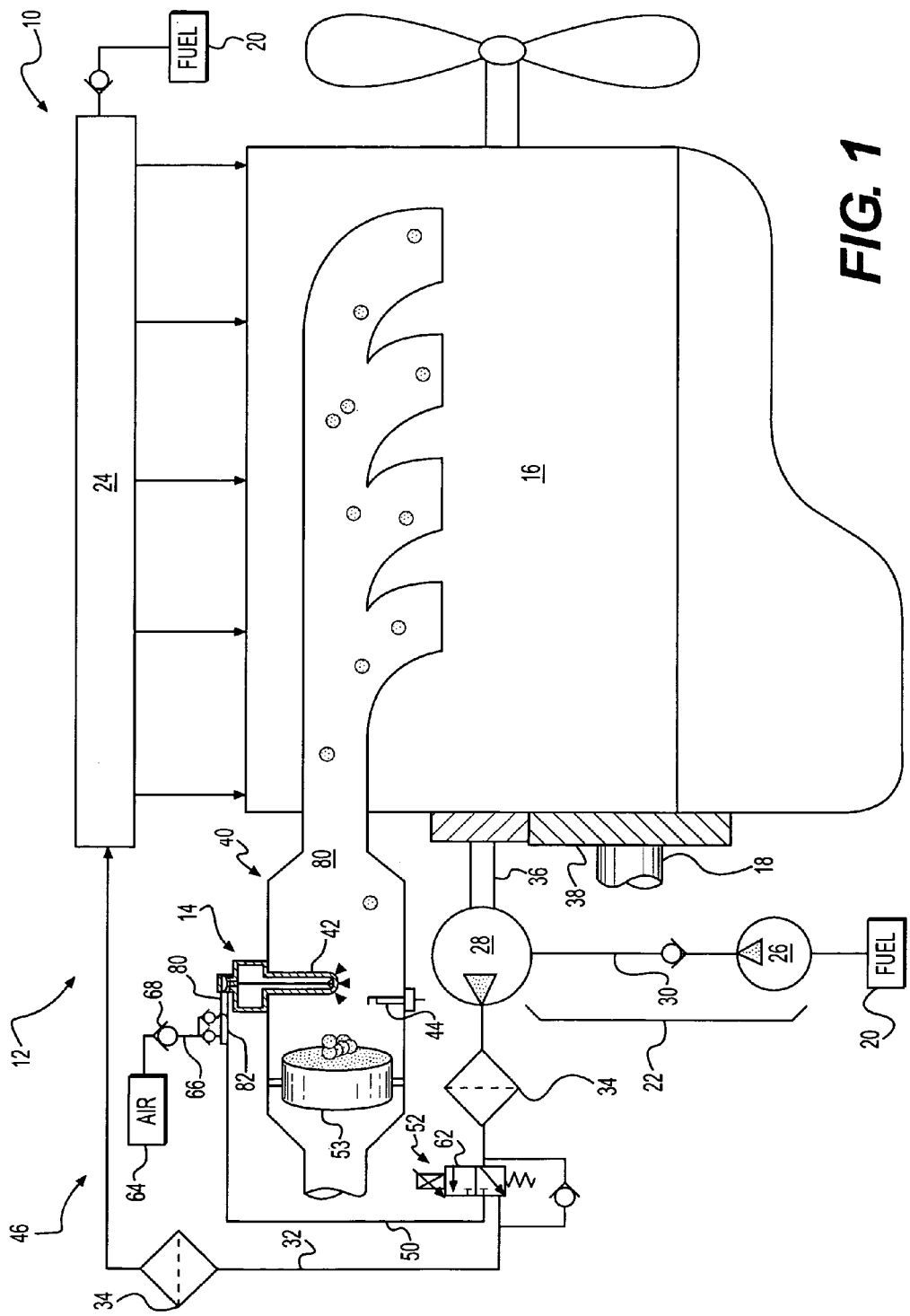
FIG. 1 is a schematic and diagrammatic illustration of an exemplary disclosed power unit.

FIG. 1 illustrates a power unit 10 having a common rail fuel system 12 and an auxiliary regeneration system 14. For the purposes of this disclosure, power unit 10 is depicted and described as a four-stroke diesel engine. One skilled in the art will recognize, however, that power unit 10 may be any other type of internal combustion engine such as, for example, a gasoline or a gaseous fuel-powered engine. Power unit 10 may include an engine block 16 that at least partially defines a plurality of combustion chambers (not shown). In the illustrated embodiment, power unit 10 includes four combustion chambers. However, it is contemplated that power unit 10 may include a greater or lesser number of combustion chambers and that the combustion chambers may be disposed in an "in-line" configuration, a "V" configuration, or any other suitable configuration.

As also shown in FIG. 1, power unit 10 may include a crankshaft 18 that is rotatably disposed within engine block 16. A connecting rod (not shown) may connect a plurality of pistons (not shown) to crankshaft 18 so that a sliding motion of each piston within the respective combustion chamber results in a rotation of crankshaft 18. Similarly, a rotation of crankshaft 18 may result in a sliding motion of the pistons.

Common rail fuel system 12 may include components that cooperate to deliver injections of pressurized fuel into each of the combustion chambers. Specifically, common rail fuel system 12 may include a tank 20 configured to hold a supply of fuel, and a fuel pumping arrangement 22 configured to pressurize the fuel and direct the pressurized fuel to a plurality of fuel injectors (not shown) by way of a common rail 24.

Fuel pumping arrangement 22 may include one or more pumping devices that function to increase the pressure of the fuel and direct one or more pressurized streams of fuel to common rail 24. In one example, fuel pumping arrangement 22 includes a low pressure source 26 and a high pressure source 28 disposed in series and fluidly connected by way of a fuel line 30. Low pressure source 26 may embody a transfer pump that provides low pressure feed to high pressure source 28. High pressure source 28 may receive the low pressure feed and increase the pressure of the fuel to the range of about 30-300 MPa. High pressure source 28 may be connected to common rail 24 by way of a fuel line 32. One or more filtering elements 34, such as a primary filter and a secondary filter, may be disposed within fuel line 32 in series relation to remove debris and/or water from the fuel pressurized by fuel pumping arrangement 22.

One or both of low and high pressure sources 26, 28 may be operably connected to power unit 10 and driven by crankshaft 18. Low and/or high pressure sources 26, 28 may be connected with crankshaft 18 in any manner readily apparent to one skilled in the art where a rotation of crankshaft 18 will result in a corresponding driving rotation of a pump shaft. For example, a pump driveshaft 36 of high pressure source 28 is shown in FIG. 1 as being connected to crankshaft 18 through a gear train 38. It is contemplated, however, that one or both of low and high pressure sources 26, 28 may alternatively be driven electrically, hydraulically, pneumatically, or in any other appropriate manner. It is further contemplated that common rail fuel system 12 may alternatively embody another type of fuel system such as, for example, mechanical unit fuel injector systems where the pressure of the injected fuel is generated or enhanced within the individual injectors without the use of a high pressure source.

Auxiliary regeneration system 14 may be associated with an exhaust treatment device 40. In particular, as exhaust from power unit 10 flows through exhaust treatment device 40, particulate matter may be removed from the exhaust flow by wire mesh or ceramic honeycomb filtration media 53. Over time, the particulate matter may build up in filtration media 53 and, if left unchecked, the particulate matter buildup could be significant enough to restrict, or even block the flow of exhaust through exhaust treatment device 40, allowing for backpressure within the power unit 10 to increase. An increase in the backpressure of power unit 10 could reduce the power unit's ability to draw in fresh air, resulting in decreased performance, increased exhaust temperatures, and poor fuel consumption. Auxiliary regeneration system 14 may include components that cooperate to periodically reduce the buildup of particulate matter within exhaust treatment device 40. These components may include, among other things, an injector 42, a spark plug 44, and a purge system 46. It is contemplated that auxiliary regeneration system 14 may include additional or different components such as, for example, one or more pilot injectors, additional main injectors, a controller, a pressure sensor, a temperature sensor, a flow sensor, a flow blocking device, and other components known in the art.

Injector 42 may be disposed within a housing of exhaust treatment device 40 and connected to fuel line 32 by way of a fuel passageway 50 and a main control valve 52. Injector 42 may be operable to inject an amount of pressurized fuel into exhaust treatment device 40 at predetermined timings, fuel pressures, and fuel flow rates. The timing of fuel injection into exhaust treatment device 40 may be synchronized with sensory input received from a temperature sensor (not shown), one or more pressure sensors (not shown), a timer (not shown), or any other similar sensory devices such that the injections of fuel substantially correspond with a buildup of particulate matter within exhaust treatment device 40. For example, fuel may be injected as a pressure of the exhaust flowing through exhaust treatment device 40 exceeds a predetermined pressure level or a pressure drop across filtration media 53 of exhaust treatment device 40 exceeds a predetermined differential value. Alternatively or additionally, fuel may be injected as the temperature of the exhaust flowing through exhaust treatment device 40 exceeds a predetermined value. It is contemplated that fuel may also be injected on a set periodic basis, in addition to or regardless of pressure and temperature conditions, if desired.

Main control valve 52 may include an electronically controlled valve element 62 that is solenoid movable against a spring bias in response to a commanded flow rate. Valve element 62 may be movable from a first position at which pressurized fuel may be directed to common rail 24, to a second position at which fuel may be directed to auxiliary regeneration system 14. Valve element 62 may be connected to receive electronic signals indicative of which of the first and second positions is desired. It is contemplated that valve element 62 may alternatively be hydraulically or pneumatically actuated in an indirect manner, if desired.

Spark plug 44 may facilitate ignition of fuel sprayed from injector 42 into exhaust treatment device 40 during a regeneration event. Specifically, during a regeneration event, the temperature of the exhaust exiting power unit 10 may be too low to cause auto-ignition of the particulate matter trapped within exhaust treatment device 40 or of the fuel sprayed from injector 42. To initiate combustion of the fuel and, subsequently, the trapped particulate matter, a small quantity (i.e., a pilot shot) of fuel from injector 42 may be sprayed or otherwise injected toward spark plug 44 to create a locally rich atmosphere readily ignitable by spark plug 44. A spark developed across electrodes of spark plug 44 may ignite the locally rich atmosphere creating a flame, which may be jetted or otherwise advanced toward the trapped particulate matter. The flame jet propagating from injector 42 may raise the temperature within exhaust treatment device 40 to a level, which readily supports efficient ignition of a larger quantity (i.e., a main shot) of fuel from injector 42. As the main injection of fuel ignites, the temperature within exhaust treatment device 40 may continue to rise to a level that causes ignition of the particulate matter trapped within filtration media 53, thereby regenerating exhaust treatment device 40.

Purge system 46 may selectively purge injector 42 of residual fuel. In particular, purge system 46 may include a supply of pressurized purge fluid 64 such as compressed air, natural gas, water, a cleaning solution, or a combination of any of these fluids in communication with fuel passageway 50 by way of a purge passageway 66. The supply of pressurized purge fluid 64 may include a fluid source (not shown) such as, for example, a compressor, an air pump, or any other suitable fluid source. It is also contemplated that the supply of pressurized purge fluid 64 may also include a storage reservoir, if desired, such as, for example, a tank or an accumulator having sufficient volume to complete a purging process with or without operation of the fluid source. Purge passageway 66 may fluidly connect to injector 42 at any upstream location. A check valve 68 may be disposed within purge passageway 66 to ensure that fuel from passageway 50 is blocked from flowing through purge passageway 66 to the supply of pressurized purge fluid 64. The flow of purge fluid through purge passageway 66 may be controlled by way of a suitable valve arrangement (not shown).

Figure 2A:
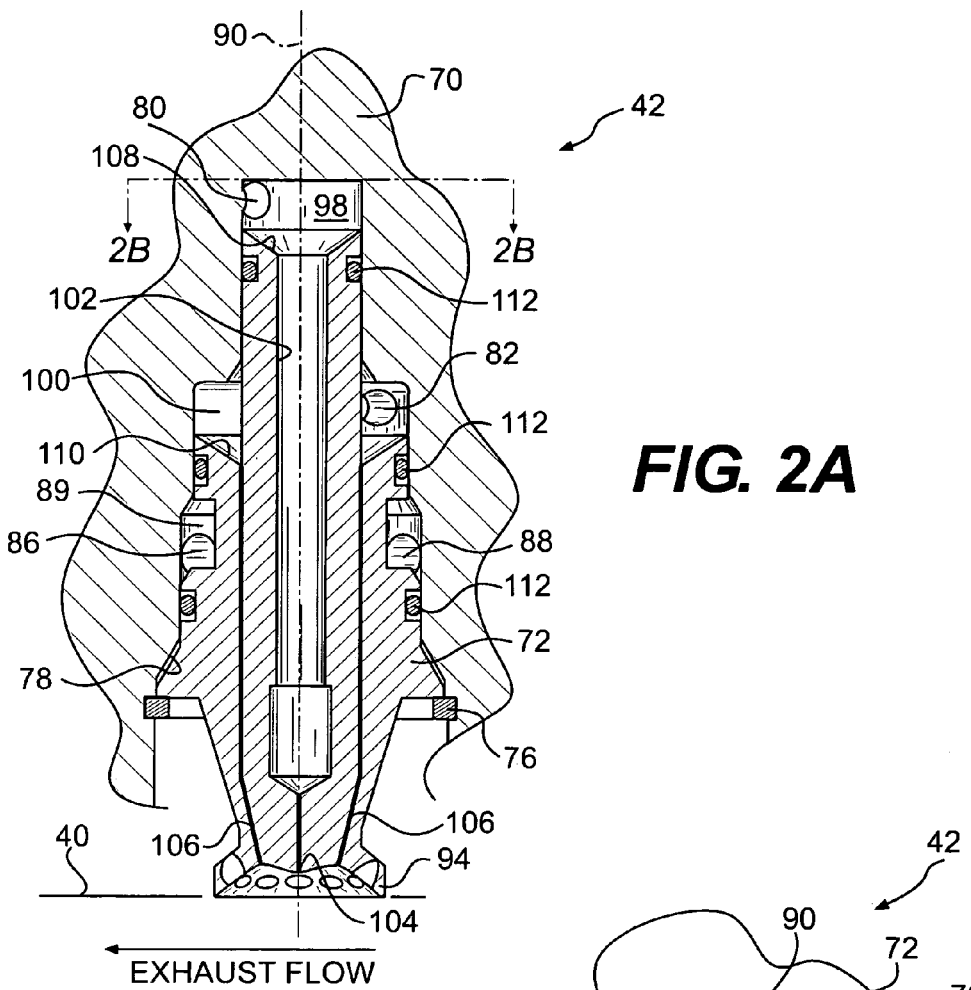
FIG. 2A is a cross-sectional illustration an exemplary disclosed fuel injector for use with the power unit of FIG. 1.

FIG. 2A illustrates one exemplary embodiment of injector 42. In this example, injector 42 may include a housing 70, and a nozzle member 72. Nozzle member 72 may be received within housing 70, and held in place by way of a snap ring 76. It is contemplated that nozzle member 72 may be held in place by a means other than a snap ring, if desired, such as, for example threaded fastening, welding, press fitting, or chemical bonding.

Figure 2B:
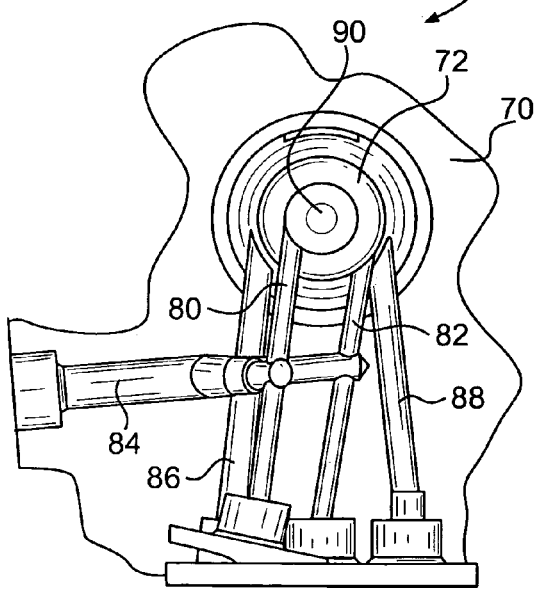
FIG. 2B is a top view pictorial illustration of the fuel injector of FIG. 2A.

Housing 70 may receive and fluidly connect nozzle member 72 with fuel, air, coolant, and exhaust. In particular, housing 70 may be formed in or connected to an outer wall portion of exhaust treatment device 40, and include a stepped bore 78 for receiving nozzle member 72. As illustrated in FIG. 2B, housing 70 may also have formed therein a pilot fuel passage 80, a main fuel passage 82, a branching passage 84, and inlet and outlet cooling passages 86 and 88. Each of these passages may open into stepped bore 78 at different locations to communicate their respective fluids therewith.

Pilot fuel passage 80 and main fuel passage 82 may both be formed within housing 70 to extend from fuel passageway 50 (referring to FIG. 1) to different axially spaced apart locations of stepped bore 78. Namely, pilot fuel passage 80 may be located to intersect a first step of bore 78 at a greater axial depth than the intersection of main fuel passage 82 with stepped bore 78. The diameter of stepped bore 78 at the entrance of pilot fuel passage 80 may be less than the diameter at the entrance of main fuel passage 82. Both pilot and main fuel passages 80 and 82 may be oriented to intersect stepped bore 78 at a position and angle radially offset from and tangential to a central axis 90 of stepped bore 78. That is, the flow of fuel delivered from pilot and main fuel passages 80 and 82 into stepped bore 78 may avoid immediately passing through a central portion of stepped bore 78, and instead may be first directed tangentially into contact with an outer cylindrical wall of stepped bore 78 relative to central axis 90, thereby creating a swirling or spiraling motion as the fuel flows around the outer cylindrical wall and then downward into nozzle member 72. A check valve (not shown) may be disposed within each of pilot and main passageways 80, 82, if desired, to provide a redundant seal in addition to check valve 68 (referring to FIG. 1), and to minimize the amount of trapped fuel volume, which must be purged through pilot and main fuel passages 80, 82.

Branching passage 84 may communicate the pressurized purge fluid from supply 64 with nozzle member 72 via purge passageway 66 and pilot and main fuel passages 80, 82. In particular, at a time between regeneration events (i.e. when fuel is blocked from flowing through injector 42), purge fluid may selectively flow from supply 64 through purge passageway 66, though branching passage 84, to both pilot and main fuel passages 80, 82. As the pressurized purge fluid flows through these passages, the fuel therein may be forced into and through nozzle member 72, thereby purging injector 42 of fuel. For the same reason stated above with regard to fuel, the purge fluid forced through pilot and main fuel passages 80, 82 may also be caused to swirl into stepped bore 78 and through nozzle member 72. This swirling motion may improve the purging of fuel from nozzle member 72. Although illustrated in FIG. 2b as branching to both pilot and main fuel passages 80, 82, it is contemplated that branching passage 84 may alternatively intersect fuel passageway 50, upstream of pilot and main fuel passages 80, 82, if desired. This alternative configuration is illustrated in FIG. 1.

Inlet and outlet cooling passages 86, 88 may both be formed within housing 70 to facilitate cooling of nozzle member 72. Specifically, inlet cooling passage 86 may intersect a cooling chamber 89 of stepped bore 78 on a first side of nozzle member 72, while outlet cooling passage 88 may intersect cooling chamber 89 on a second side opposite the first. Coolant such as, for example, water; glycol; a water/glycol mixture; a power source oil such as transmission oil, engine oil, brake oil, or diesel fuel; a high-pressure fluid such as R-134, propane, nitrogen, or helium; or any other coolant known in the art, may be directed through inlet cooling passage 86, around nozzle member 72, and out of stepped bore 78 via outlet cooling passage 88. As the coolant contacts housing 70 and nozzle member 72, the coolant may absorb heat therefrom. Similar to pilot and main fuel passages 80, 82, inlet and outlet cooling passages 86, 88 may also be located at a position and angle radially offset and tangential to central axis 90. It is contemplated that inlet and outlet cooling passages 86, 88 may be omitted, if desired.

Nozzle member 72 may be a generally cylindrical member configured to direct fuel from pilot and main fuel passages to a nozzle tip 94. In particular, nozzle member 72 may be situated within stepped bore 78 to form a pilot chamber 98 and a main chamber 100. Pilot fuel passage 80 may empty into pilot chamber 98, while main fuel passage 82 may empty into main chamber 100. A central bore 102 may fluidly connect pilot chamber 98 with a pilot injection orifice 104 in nozzle tip 94. A plurality of main fuel orifices 106 may be annularly disposed about pilot injection orifice 104 and in fluid communication with main chamber 100.

To improve purge effectiveness, the upper surfaces of nozzle member 72 in fluid contact with pilot and main chambers 98, 100, may be tapered. Specifically, an upper surface 108, which is in contact with and forms a portion of pilot chamber 98, may have a female taper. The female taper of upper surface 108 may begin at an outer peripheral edge of nozzle member 72 and angle inward toward central axis 90, and downward toward nozzle tip 94. Similarly, an upper surface 110, which is in contact with and forms a portion of main chamber 100, may also have a female taper. The female taper of upper surface 110 may likewise begin at an outer peripheral edge of nozzle member 72 and angle inward toward central axis 90, and downward toward nozzle tip 94. This tapering of upper surfaces 108 and 110, combined with the location of central bore 102 and main injection orifices at the apex of the tapers, may allow any fuel left in the pilot and main chambers 98, 100 of a vertically oriented fuel injector 42 to be drawn by gravity downward toward nozzle tip 94 and out of injector 42. The taper angle of upper surfaces 108 and 110 may or may not be the same.

One or more sealing devices may be associated with nozzle member 72 to minimize fluid leakage and contamination. For example, a first sealing device 112 such as an o-ring may be situated within stepped bore 78, between pilot and main chambers 98, 100 to minimize leakage between the two chambers. A second sealing device 112 may be situated within stepped bore 78, between main and cooling chambers 100, 89 to minimize contamination of the fuel within main chamber 100 or of the coolant within cooling chamber 89. A third sealing device 112 may be situated within stepped bore 78, between cooling chamber 89 and nozzle tip 94 to minimize leakage from injector 42. It is contemplated that a greater or lesser number of sealing devices 112 may utilized, and/or that sealing devices 112 may be situated in locations other than as described above, if desired.

INDUSTRIAL APPLICABILITY

The fluid injector of the present disclosure may be applicable to a variety of exhaust treatment devices including, for example, particulate traps requiring periodic regeneration, catalytic converters requiring a predetermined temperature for optimal operation, and other similar devices known in the art. In fact, the disclosed fuel injector may be implemented into any engine system that benefits from clog-free injector operation. The operation of power unit 10 will now be explained.

Referring to FIG. 1, air and fuel may be drawn into the combustion chambers of power unit 10 for subsequent combustion. Specifically, fuel from common rail fuel system 12 may be injected into the combustion chambers of power unit 10, mixed with the air therein, and combusted by power unit 10 to produce a mechanical work output and an exhaust flow of hot gases. The exhaust flow may contain a complex mixture of air pollutants composed of gaseous and solid material, which can include particulate matter. As this particulate laden exhaust flow is directed from the combustion chambers through exhaust treatment device 40, particulate matter may be strained from the exhaust flow by filtration media 53. Over time, the particulate matter may build up in filtration media 53 and, if left unchecked, the buildup could be significant enough to restrict, or even block the flow of exhaust through exhaust treatment device 40. As indicated above, the restriction of exhaust flow from power unit 10 may increase the backpressure of power unit 10 and reduce the unit's ability to draw in fresh air, resulting in decreased performance of power unit 10, increased exhaust temperatures, and poor fuel consumption.

To prevent the undesired buildup of particulate matter within exhaust treatment device 40, filtration media 53 may be regenerated. Regeneration may be periodic or based on a triggering condition such as, for example, a lapsed time of engine operation, a pressure differential measured across filtration media 53, a temperature of the exhaust flowing from power unit 10, or any other condition known in the art.

To initiate regeneration, injector 42 may be caused to selectively pass fuel into exhaust treatment device 40 at a desired rate. As a pilot injection of fuel from injector 42 sprays into exhaust treatment device 40, a spark from spark plug 44 may ignite the fuel. As a main injection of fuel from injector 42 is passed into exhaust treatment device 40, the burning pilot flow of fuel may ignite the main flow of fuel. The ignited main flow of fuel may then raise the temperature of the particulate matter trapped within filtration media 53 to the combustion level of the entrapped particulate matter, burning away the particulate matter and, thereby, regenerating filtration media 53.

Between regeneration events, injector 42 may be selectively purged of fuel to ensure proper operation of injector 42. To purge injector 42, purge fluid from supply 64 may be directed through purge passageway 66, past check valve 68, through fuel passageway 50, and through pilot and main fuel passages 80, 82. As the purge fluid exits pilot and main fuel passages 80, 82 into pilot and main chambers 98, 100, it may be directed against the outer cylindrical walls of pilot and main chambers 98, 100, thereby initiating a swirling movement within the chambers. The purge fluid flowing into these chambers may force any remaining fuel within these chambers out of injector 42 via pilot injection orifice 104 and the plurality main fuel orifices 106. The swirling movement of the purge fluid may improve the purge affect by reducing the amount of dead space (i.e., the space within injector 42 having no or little purge fluid flow) at the periphery of pilot and main chambers 98, 100.

In addition, to being forced from injector 42 by the flow of purge fluid, any remaining fuel within pilot and main chambers 98, 100 may also be acted on by gravity. That is, because the lower surfaces of the pilot and main chambers 98, 100 (i.e., the upper surfaces of nozzle member 72) have a female taper (i.e., are sloped downward toward nozzle tip 94), gravity may act to naturally draw this fuel downward toward pilot injection orifice 104 and the plurality main fuel orifices 106.

The design of injector 42 may ensure that a maximum amount of fuel is purged between regeneration events. In particular, because injector 42 incorporates both the swirling purge fluid and the female tapers, the amount of dead space and the number of locations free from the affects of gravity within injector 42 may be reduced. By reducing the amount of dead space and the number of locations free from the affects of gravity, a greater amount of fuel may be purged from injector 42 between regeneration events. A greater efficiency of the purge process may result in less restriction and fewer blockages within injector 42.

It will be apparent to those skilled in the art that various modifications and variations can be made to the fuel injector of the present disclosure without departing from the scope of the disclosure. Other embodiments will be apparent to those skilled in the art from consideration of the specification and practice of the fuel injector disclosed herein. For example, although the disclosed injector is illustrated as drawing pressurized fuel from a common rail fuel system, the disclosed injector may alternatively draw pressurized fuel from a separate dedicated source, if desired. Further, although general examples have illustrated the disclosed injector as being associated with the injection of fuel for particulate regeneration purposes, it is contemplated that injector 42 may just as easily be applied to the injection of urea and/or AdBlue within a Selective Catalytic Reduction (SCR) device, if desired. It is intended that the specification and examples be considered as exemplary only, with a true scope of the disclosure being indicated by the following claims and their equivalents.

What is claimed is:

1. A fluid injector for an exhaust treatment device of an internal combustion engine system, comprising:
   a housing at least partially forming a fluid chamber and having a central bore oriented along a central axis of the housing;
   a nozzle member disposed within the central bore and oriented along the central axis of the housing, the nozzle member being configured to introduce fluid into an engine exhaust stream, the nozzle member including an upper surface at least partially forming the fluid chamber, the upper surface having a female taper directed toward a tip of the nozzle member; and
   a fluid passageway configured to supply fluid to the fluid chamber in a tangential direction relative to the central axis such that the tangential supply of fluid to the fluid chamber initiates a swirling motion of the fluid into the central bore.

2. The fluid injector of claim 1, wherein the housing at least partially forms a second fluid chamber and the fluid injector further includes a second fluid passageway configured to supply fluid to the second fluid chamber in a tangential direction relative to the central axis.

3. The fluid injector of claim 2, wherein the second fluid chamber is axially spaced apart from the fluid chamber.

4. The fluid injector of claim 2, wherein the fluid passageway is configured to supply fluid to the fluid chamber at a flow rate less than a flow rate of fluid supplied to the second fluid chamber.

5. The fluid injector of claim 4, further including a plurality of passageways annularly disposed about the central bore, wherein the central bore fluidly communicates the fluid chamber with a tip of the nozzle member, and the plurality of passageways fluidly communicate the second fluid chamber with the tip of the nozzle member.

6. The fluid injector of claim 1, further including:
a first fluid supply containing a first fluid;
a second fluid supply containing a second fluid, dissimilar from the first fluid;
wherein the passageway is configured to selectively and separately direct the two dissimilar fluids to the fluid chamber.

7. The fluid injector of claim 6, wherein:
the housing at least partially forms a second fluid chamber; and
the housing includes:
a second fluid passageway configured to supply a third dissimilar fluid to the second fluid chamber; and
a third fluid passageway configured to drain the third dissimilar fluid from the second fluid chamber.

8. The fluid injector of claim 1, wherein the upper surface having the female taper is disposed near an inlet of the chamber.

9. A fluid injector for an exhaust treatment device of an internal combustion engine system, comprising:
a housing having a central axis and a bore oriented along the central axis;
a passageway configured to supply fluid to the bore; and
a nozzle member disposed within the housing and the bore to form a chamber receiving fluid from the passageway, the nozzle member having an upper surface with a female taper in communication with the chamber and directed toward a tip of the nozzle member, the tip of the nozzle member being configured to introduce fluid into an engine exhaust stream,
wherein the passageway is configured to supply fluid to the chamber in a tangential direction relative to the central axis such that the tangential supply of fluid initiates a swirling motion of the fluid into the bore.

10. The fluid injector of claim 9, wherein:
the housing and the nozzle member form a second chamber and the fluid injector further includes a second passageway configured to supply fluid to the second chamber;
the second chamber is axially spaced apart from the fluid chamber; and
the passageway is configured to supply fluid to the chamber at a flow rate less than a flow rate of fluid supplied to the second chamber.

11. The fluid injector of claim 10, wherein the nozzle member has a second upper surface with a female taper in communication with the second chamber and directed toward the tip of the nozzle member.

12. The fluid injector of claim 10, wherein:
the nozzle member includes a central bore, and a plurality of passageways annularly disposed about the central bore;
the central bore fluidly communicates the chamber with a tip of the nozzle member; and
the plurality of passageways fluidly communicates the second chamber with the tip of the nozzle member.

13. The fluid injector of claim 9, further including:
a first fluid supply containing a first fluid;
a second fluid supply containing a second fluid, dissimilar to the first fluid;
wherein the passageway is configured to selectively and separately direct the two dissimilar fluids to the fluid chamber.

14. The fluid injector of claim 13, wherein:
the housing and the nozzle member form a second chamber; and
the fluid injector includes:
a second passageway configured to supply a third dissimilar fluid to the second chamber; and
a third fluid passageway configured to drain the third dissimilar fluid from the second chamber.

15. An exhaust treatment device for a power source, comprising:
a housing configured to receive exhaust from the power source;
a particulate trap disposed within the housing and being configured to remove particulate matter from the exhaust; and
a fuel injector configured to inject fuel into the exhaust to regenerate the particulate trap, the fuel injector including:
a nozzle member disposed within the housing to form a fluid chamber with a central axis, the nozzle member having a female tapered upper surface in communication with the fluid chamber, the female tapered upper surface at least partially forming the fluid chamber, and the female taper being directed toward a tip of the nozzle member; and
a fluid passageway configured to supply fluid to the fluid chamber in a tangential direction relative to the central axis such that a swirling motion of the fluid is generated.

16. The exhaust treatment device of claim 15, wherein:
the nozzle member and the housing form a second fluid chamber;
the nozzle member has a second female tapered upper surface in communication with the second fluid chamber; and
the fluid injector further includes a second fluid passageway configured to supply fluid to the second fluid chamber in a tangential direction relative to the central axis such that a swirling motion of the fluid into the second female tapered upper surface is generated.

17. The exhaust treatment device of claim 16, wherein the fluid passageway is configured to supply fluid to the fluid chamber at a flow rate less than a flow rate of fluid supplied to the second fluid chamber.

18. The exhaust treatment device of claim 15, wherein:
the nozzle member has a central bore and a plurality of passageways annularly disposed about the central bore;
the central bore fluidly communicates the fluid chamber with a tip of the nozzle member; and
the plurality of passageways fluidly communicates the second fluid chamber with the tip of the nozzle member.

19. The exhaust treatment device of claim 16, further including:
a first fluid supply containing a first fluid;
a second fluid supply containing a second fluid, dissimilar from the first fluid;
wherein the passageway is configured to selectively and separately direct the two dissimilar fluids to both the fluid chamber and the second fluid chamber;

the nozzle member and the housing form a third fluid chamber; and the fluid injector further includes:
a third fluid passageway configured to supply a third dissimilar fluid to the third fluid chamber; and
a fourth fluid passageway configured to drain the third dissimilar fluid from the third fluid chamber.

20. A method of purging an injector for an exhaust treatment device of an internal combustion engine system, comprising:

pressurizing a flow of fuel;
directing the flow of fuel through an injector into an engine exhaust stream;
pressurizing a flow of air;
directing the flow of air into a chamber formed in the injector in a tangential direction relative to a central axis of the chamber and over a surface with a female taper which is in communication with the chamber, to generate a swirl in the flow of air within the injector; and
directing the swirling flow of air through the injector.

21. The method of claim 20, wherein directing the flow of fuel includes directing a pilot flow of fuel through a first flow path of the injector and directing a main flow of fuel through a completely different second flow path of the injector.

22. The method of claim 21, wherein directing the flow of air includes directing the flow of air into the injector in the tangential direction relative to the central axis at two separate locations.

23. The method of claim 22, wherein the directing of the pilot flow and the directing of the main flow are accomplished substantially sequentially, and the directing of the flow of air at two separate locations is accomplished substantially simultaneously.

24. The method of claim 20, wherein directing the flow of fuel through the injector further includes directing the flow of fuel through a bore of the injector; and
wherein directing the swirling flow of air through the injector further includes directing the swirling flow of air through the bore of the injector separately from the flow of fuel.

* * * * *